United States Patent
Shah et al.

(10) Patent No.: US 7,856,019 B2
(45) Date of Patent: Dec. 21, 2010

(54) CONVERGENCE OF MULTICAST TRAFFIC

(75) Inventors: Sunil P. Shah, San Jose, CA (US); Arnel Lim, San Jose, CA (US); Donald B. Grosser, Apex, NC (US); Jim Pan, San Ramon, CA (US); Kesavan Thiruvenkatasamy, Sunnyvale, CA (US); Ki-Hong Park, Cupertino, CA (US); Manpreet S. Sandhu, Santa Clara, CA (US); Prakash Kashyap, Cupertino, CA (US)

(73) Assignee: Extreme Networks, Inc., Santa Clara, CA (US)

( * ) Notice: Subject to any disclaimer, the term of this patent is extended or adjusted under 35 U.S.C. 154(b) by 64 days.

(21) Appl. No.: 12/205,715

(22) Filed: Sep. 5, 2008

(65) Prior Publication Data

US 2010/0054246 A1    Mar. 4, 2010

Related U.S. Application Data

(63) Continuation-in-part of application No. 12/201,799, filed on Aug. 29, 2008, now abandoned.

(51) Int. Cl.
*H04L 12/28* (2006.01)
*H04L 12/56* (2006.01)

(52) U.S. Cl. .................. 370/390; 370/392
(58) Field of Classification Search .......... 370/389, 370/390, 392
See application file for complete search history.

(56) References Cited

U.S. PATENT DOCUMENTS 5,978,378 A * 11/1999 Van Seters et al. .......... 370/401
6,766,482 B1  7/2004 Yip et al.
6,801,506 B1 10/2004 Dey
7,626,930 B2 12/2009 Agmon et al.

(Continued)

FOREIGN PATENT DOCUMENTS

WO    WO 03/077459    9/2003

(Continued)

OTHER PUBLICATIONS

International Search Report & Written Opinion for PCT/US2009/036539, mailed Jul. 24, 2009, 20 pages.

(Continued)

*Primary Examiner*—Ronald Abelson
(74) *Attorney, Agent, or Firm*—Blakely Sokoloff Taylor & Zafman, LLP

(57) ABSTRACT

A multicast data packet sent from a source node is received by a transit node. The multicast data packet includes a source address and a multicast group address. A hardware cache miss is detected at the transit node for the multicast data packet. The multicast data packet is hardware-flooded onto ports of the network. The flooding consists of forwarding a copy of the multicast data packet to neighbor nodes of the transit node based on virtual local area network (VLAN) membership. A cache-miss copy of the multicast data packet is sent to an out-of-line processing unit where it is processed in software. The processing includes establishing, via a hardware abstraction layer, a hardware cache entry for the multicast data packet. The cache-miss copy is not forwarded onto the network.

17 Claims, 7 Drawing Sheets

U.S. PATENT DOCUMENTS

| | | | |
|---|---|---|---|
| 2005/0094634 A1 | 5/2005 | Santhanakrishnan et al. | |
| 2007/0115989 A1* | 5/2007 | Mirtorabi et al. | 370/392 |
| 2007/0204068 A1 | 8/2007 | Oku et al. | |
| 2007/0253326 A1 | 11/2007 | Saha et al. | |
| 2008/0240118 A1* | 10/2008 | Roy et al. | 370/400 |
| 2009/0269062 A1* | 10/2009 | Jestel et al. | 398/59 |

FOREIGN PATENT DOCUMENTS

| | | |
|---|---|---|
| WO | WO 2004/102853 | 11/2004 |
| WO | WO 2008/055427 | 5/2008 |

OTHER PUBLICATIONS

International Search Report and Written Opinion mailed Sep. 29, 2009 for PCT/US2009/051681.

Christensen, M., et al., "Considerations for Internet Group Management Protocol (IGMP) and Multicast Listener Discovery (MLD) Snooping Switches", rfc4541.txt. IETF Standard, Internet Engineering Task Force, May 2006.

Christensen, M., et al., "IGMP and MLD Snooping Switches", draft-ietf-magma-snoop-00.txt. IETF Standard-Working-Draft, Internet Engineering Task Force, Oct. 2001.

Schneider, K., et al., "Design and Implementation of an Offload Engine for Internet Group Messaging Protocol Multicast Snooping", IET Communications. 2008, vol. 2, No. 3, pp. 484-492.

Serbest, Y., et al., "Supporting IP Multicast over VPLS", draft-serbest-l2vpn-vpls-mcast-03.txt. IETF Standard Working Draft. Internet Engineering Task Force. Jul. 2005.

Non-Final Office Action for U.S. Appl. No. 12/098,286, mailed Dec. 17, 2009, 18 pages.

Pending U.S. Appl. No. 12/098,286, filed Apr. 4, 2008, inventor Kashyap et al.

* cited by examiner

CONVERGENCE OF MULTICAST TRAFFIC

This application is a Continuation-in-Part of U.S. patent application Ser. No. 12/201,799 entitled Improved Convergence of Multicast Traffic and filed on Aug. 29, 2008, now abandoned and claims priority thereto.

FIELD

Embodiments disclosed herein relate to computer networking and more particularly to convergence of multicast traffic after a topology change in a network.

BACKGROUND

Multicasting is a technique for point-to-multipoint communication over an Internet Protocol (IP) infrastructure. Multicasting leverages network infrastructure to require that a source only send a single packet out to the network, even if it needs to be delivered to multiple destinations. The leveraging is accomplished by having network nodes replicate the packet (only as needed) for delivery to multiple receivers.

A multicast group address (e.g., an IP multicast) is used by sources and receivers to send and receive content. Sources use the multicast group address as the destination IP address in their data packets. Receivers use the multicast group address to "subscribe" to the multicast traffic associated with the multicast group address. In other words, these receivers use the multicast group address to communicate to the network the desire to receive traffic addressed to that multicast group.

The Internet Group Management Protocol (IGMP) is an example of a protocol that is used to manage the membership of IP multicast groups. Typically, IP hosts send out IGMP queries which are broadcast to other network hosts via multicast routers. Network devices (e.g., Layer 2 switches) can "listen in" on conversations between hosts and routers, a process known in the art as IGMP snooping. When a device hears a multicast group "join" message from a host, the device notes the interface (e.g., port) upon which it heard the message and adds the interface to the group. Similarly, when a device hears a multicast group "leave" message or a response timer expires, the switch will remove that host's switch interface from the group. These "join" and/or "leave" messages are commonly referred to as "IGMP reports." To that end, an IGMP snooping table maintains in hardware (e.g., a cache) the list of hosts and/or interfaces that are members of a multicast group based on IGMP reports.

When there is a topology change in a network that uses multicasting, the IGMP snooping table is cleared and IGMP queries are sent out, so that devices in the network can relearn the IGMP snooping membership. If there are data packets in the network during a topology change, these packets will experience a cache miss in hardware because of the clearing of the IGMP snooping table. All of the packets that experience a cache miss are sent to the device CPU for forwarding in software, which is sometimes referred to as "slow-path" forwarding because forwarding in software is significantly slower than forwarding packets in hardware.

More problematic, however, is the case where there are thousands of data packets in the network during a topology change. In this case, there are thousands of data packets in the CPU queue, consuming CPU resources which would otherwise be spent re-programming the hardware cache with new IGMP snooping table entries. In other words, as the number of multicast packets in the network increases, it increases the convergence time of the multicast traffic in the network (i.e., the time it takes to re-program the hardware cache to restore an acceptable rate of cache misses in the multicast traffic). Additionally, the scenarios described above assume a single virtual local area network (VLAN). If a large number (e.g., thousands) of VLANs exist in the network, each IGMP query would be sent out on each of the VLANs, causing all of the hosts on each VLAN to respond with their respective IGMP reports indicating their IGMP membership. Thus, the CPU is burdened with even more slow-path forwarding, exacerbating the multicast convergence problem even further.

SUMMARY OF THE INVENTION

Embodiments disclosed herein facilitate convergence of multicast traffic in a network after a topology change. When a network node receives a multicast data packet, the packet is processed. If the node detects a cache miss for the data packet, that packet is flooded via hardware onto ports of the network. Additionally, a copy of the packet (that caused the cache miss) is sent to an out-of-line processing unit. The copy of the packet is processed without forwarding the copy onto the network from the processing unit. Processing of the packet includes establishing a hardware cache entry for the packet via a hardware abstraction layer.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

DETAILED DESCRIPTION

Figure 1:
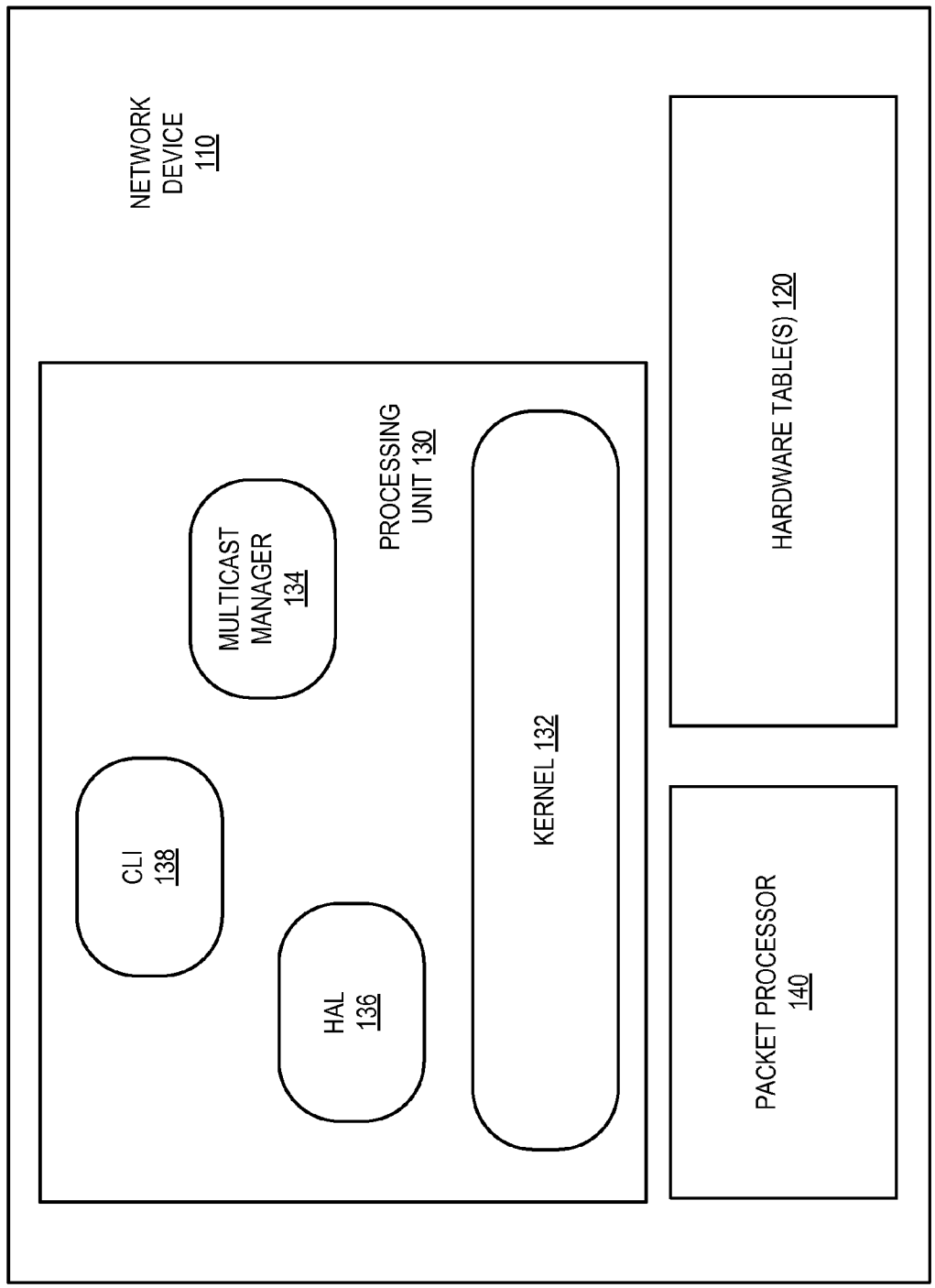
FIG. 1 is a block diagram illustrating a network device.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

As provided herein, methods, apparatuses, and systems facilitate improved convergence of multicast traffic in a network after a topology change. When a network node receives a multicast data packet, the packet is processed. If the node detects a cache miss for the data packet, that packet is flooded via hardware onto ports of the network. Additionally, a copy of the packet (that caused the cache miss) is sent to an out-of-line processing unit. The copy of the packet is processed without forwarding the copy onto the network from the processing unit. Processing of the packet includes establishing a hardware cache entry for the packet via a hardware abstraction layer.

In some embodiments, cache misses occur and are detected when a new multicast stream begins sending traffic on a network. Rather than simply forwarding the cache misses to a CPU for learning (in hardware) and subsequent forwarding (i.e., slow-path forwarding) onto the network (e.g., IGMP snooping enabled), a special forwarding mode is employed. In this special forwarding mode, packets causing cache misses are initially flooded via hardware to ports of the network. In addition, the cache misses are sent to a CPU for processing. The processing includes learning the address(es) of each packet (e.g., source IP address and multicast group IP address) and programming new entries in hardware. By programming entries in hardware, future packets having the same source and group (S, G) address will cause a cache hit and be immediately forwarded out only those ports where there are actual receivers. Forwarding only on ports where there are actual receivers may be referred to as "selective forwarding." Packets that are selectively forwarded will cease to be flooded from that point forward.

In various embodiments, the processing by the CPU specifically does NOT include forwarding cache-miss packet copies from the CPU out onto the network (e.g., "slow-path forwarding," "software-forwarding," etc.). This is because slow-path forwarding would cause duplicate packets to be sent out on the network (given that the packets causing cache misses are already being flooded to the network). The special forwarding mode may be controlled by a user, for example, via a command line interface (CLI).

In embodiments that are employed for use in a network having a ring topology (e.g., an Ethernet automatic protection switching (EAPS) ring topology), a similar special forwarding mode may be triggered automatically in response to detecting a topology change in the network. When the topology changes in an EAPS ring network, forwarding entries (referred to as forwarding database (FDB) entries) are cleared and have to be relearned. Thus, in these embodiments, a detected topology change will cause the ring network to enter a hardware flooding mode that is capped by a timer. As used herein, flooding refers to sending copies of packets on egress ports of a network device based, for example, on VLAN membership. In other words, flooding may cause packets to be forwarded on egress ports of a network device, but not necessarily on all egress ports.

During the flooding period, packets that cause cache misses are also forwarded to a network device processing unit. The processing unit creates a multicast cache entry for each cache-miss packet and the cache entries are programmed in hardware via a hardware abstraction layer. Subsequent packets that produce a hit on a hardware entry will be forwarded in hardware based on the programmed egress ports associated with the entry. In this way, cache misses will eventually taper off as the new multicast cache entries are programmed.

When the hardware flooding mode timer expires, the network device may revert back to its previous operational mode. For example, if the device were operating in an IGMP snooping-enabled mode prior to the "initial hardware flooding" mode, the device might revert back to that mode upon expiration of the timer. In embodiments that do not use IGMP snooping, it may be necessary to push the current/updated multicast cache list to the hardware abstraction layer (HAL) upon expiration of the time to prevent future cache misses.

FIG. 1 is a block diagram illustrating a network device according to various embodiments. Network device 110 includes one or more hardware tables 120 (e.g., cache) a processing unit 130 (e.g., a central processing unit (CPU), a network processing unit (NPU), etc.), and a packet processor 140. Packet processor 140 receives incoming packets. For each incoming packet (having a source address and a multicast group address), packet processor 140 does a lookup of hardware table 120 to determine if the source address and the multicast group address (S, G) of the incoming packet match one of the entries in the table. If yes, then packet processor 140 forwards the packet out to the network (e.g., based on the multicast group address).

If the (S, G) address combination does not match an entry in table 120, packet processor 140 floods all traffic having the (S, G) address combination to the network and generates a cache-miss. This cache-miss event, or simply cache-miss, is sent to processing unit 130, specifically to kernel 132. Kernel 132 sends the cache-miss to a multicast (MC) manager 134. In some embodiments, flooding will cause traffic to be sent out on all egress ports of network device 110. In other embodiments, packets will be forwarded only on egress ports based on, for example, VLAN membership.

In conjunction with packet processor 140 flooding the (S, G) traffic, processing unit 130 works to resolve the cache-miss. MC manager 134 initiates proxy IGMP queries that are sent out on the network. Based on any IGMP reports received in response to the proxy IGMP queries, MC manager 134 programs hardware abstraction layer (HAL) 136 with forwarding entries for (S, G) traffic. HAL 136 subsequently configures hardware table 120 to include the forwarding entries. Once forwarding entries have been "learned" (i.e., programmed) for the (S, G) group, subsequent (S, G) traffic will "hit" hardware table 120 and be forwarded according to the forwarding entries (i.e., without flooding). It is important to note that cache-misses are not forwarded back out to the network after processing (as would be the case in a standard IGMP snooping-enabled mode). In embodiments described herein, cache-misses are not slow-path forwarded by the CPU to the network so as to avoid duplicate packets (because, as discussed, the packets will have already been forwarded to the network via the hardware-flooding).

The initial hardware-flooding mode used by device 110 is controlled by a user via a command line interface 138 in various embodiments. Thus, the user can have the device operate in a normal IGMP snooping-enabled or snooping-disabled mode, or the user can operate the device to use IGMP snooping-enabled with initial hardware-flooding mode.

Figure 2:
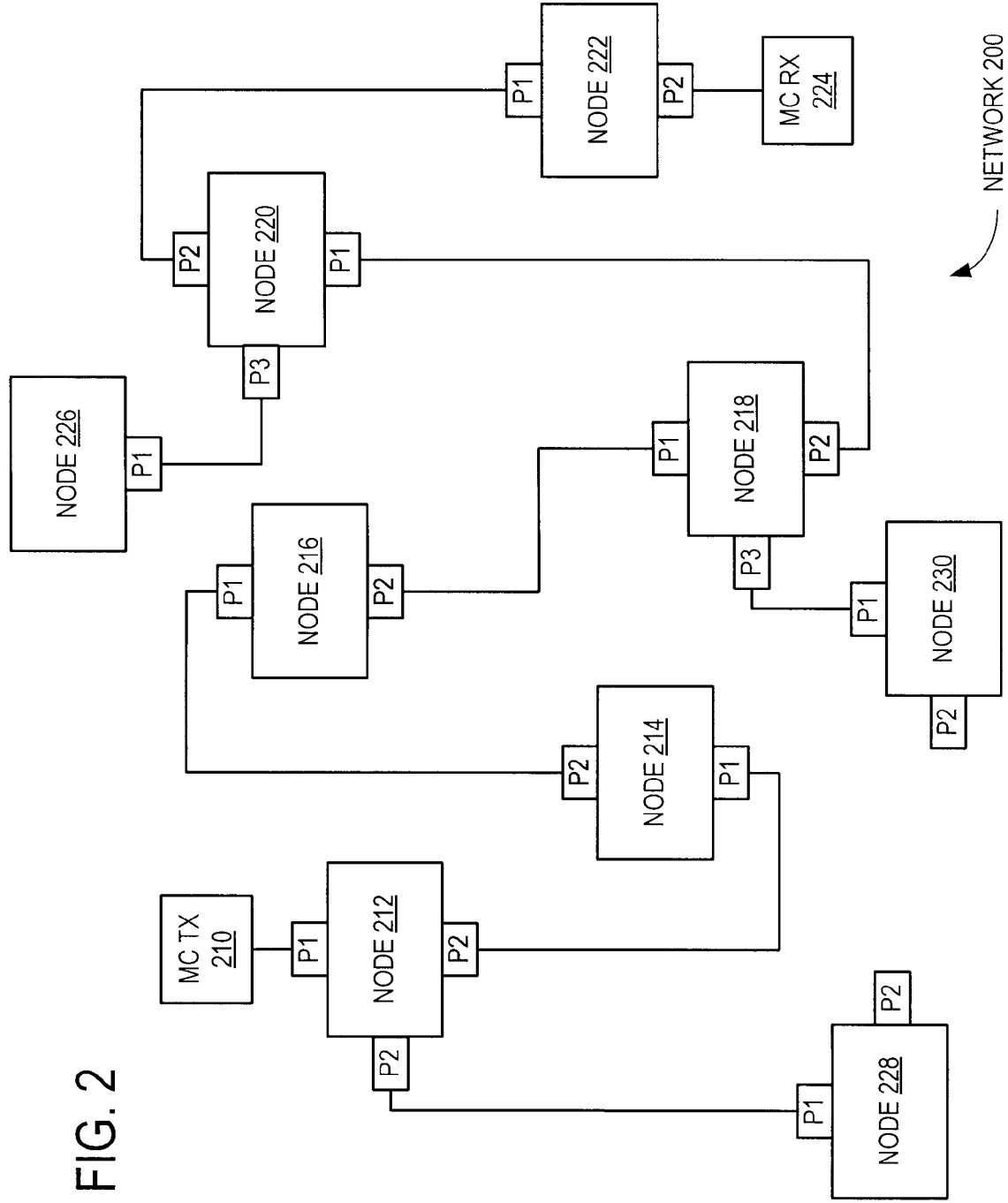
FIG. 2 is a block diagram illustrating a network that uses multicasting according to various embodiments.

FIG. 2 is a block diagram illustrating a network that employs multicasting and IGMP snooping. In a standard snooping-enabled scenario, network 200 is one in which a multicast transmitter (MC Tx) 210 sends IGMP queries to determine which nodes, if any, are interested in receiving multicast traffic for a particular multicast group, for example, group ABC. Multicast receiver (MC Rx) 224 receives the query from MC Tx 210 and reports that it is interested in receiving multicast traffic for group ABC. The various network nodes "listen" to the communication between MC Tx 210 and MC Rx 224, noting that MC Rx 224 is interested in multicast traffic for group ABC by updating their respective multicast lists for the group ABC. For example, node 222 adds port P2 to its multicast list for the group ABC given that MC Rx is communicatively connected to node 222 via port P2. Likewise, node 220 adds its port P2 to its multicast list for group ABC given that port P2 is the port by which traffic will reach MC Rx 224. As illustrated in FIG. 2, nodes 218, 216, 214 and 212 also add their respective P2 ports to their respective multicast lists for group ABC. In this way, group ABC traffic arriving at node 212 will be appropriately forwarded through the network to MC Rx 224. Additionally, in the standard snooping-enabled scenario, cache-misses are sent to the CPU. These packets may be slow-path forwarded by the CPU, but they will not be forwarded in hardware until the hardware abstraction layer programs the hardware.

However, in various scenarios, a new multicast stream may be started on network 200 without the aforementioned IGMP queries and/or reports. For example, if a stream for group XYZ is started from node 228 without any preceding IGMP queries and/or reports, each group XYZ packet that reaches network 200 will cause a cache-miss, given that none of the nodes in network 200 has any multicast list entries for group XYZ. Using the standard IGMP snooping-enabled technique, described above, these cache-misses will build up in a slow-path forwarding queue in the processing unit of the network node, sapping processing resources and delaying convergence of the XYZ stream. The convergence delay is compounded if multiple new and different streams are started at or relatively near the same time on network 200.

In various embodiments, a cache-miss at a network node, such as described above, will cause the network node to enter a state of initial hardware-flooding. As used herein, "hardware-flooding" or "initial hardware-flooding" refers to the act of hardware-flooding as an initial response to a cache-miss. As described previously, cache-misses are sent to the network device processing unit (e.g., processing unit 130 of FIG. 1) for processing. The initial hardware-flooding occurs, at least in part, during the period of time that the cache miss is being processed by the processing unit. Once the cache miss has been processed (e.g., a new entry has been programmed in hardware for the XYZ multicast group), subsequent packets belonging to the XYZ group will "hit" the cache (i.e., a table lookup for the XYZ packets will generate a match). Cache hits are honored (i.e., they will be forwarded only on the egress ports defined in the corresponding forwarding entry as opposed to flooding them).

Thus, as the number of packets "hitting" the cache increases, the size of the processing queue for cache-misses in the processing unit decreases. The initial hardware-flooding reduces the processing burden of the processing unit, facilitating faster convergence of the stream(s).

Figure 3:
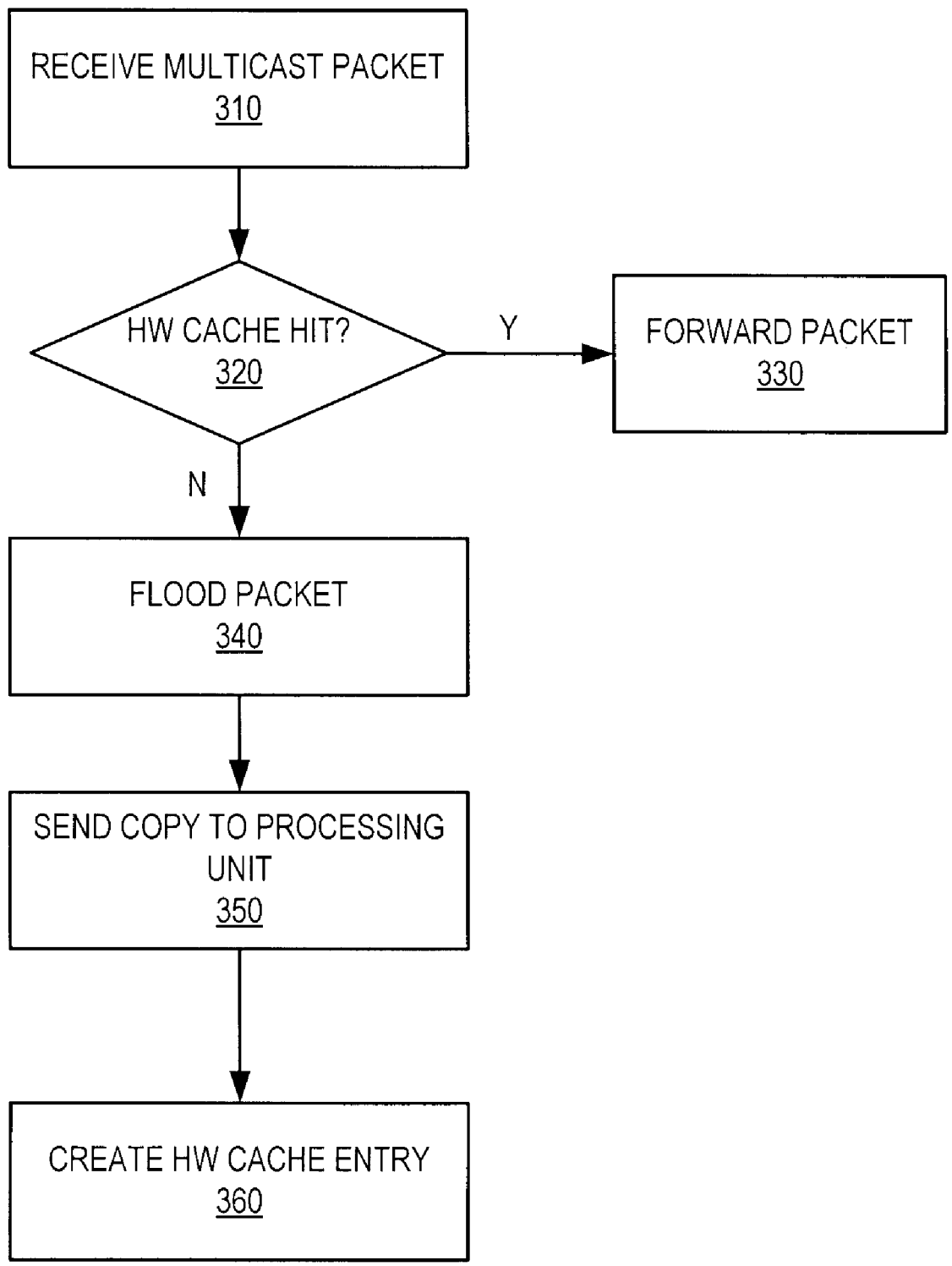
FIG. 3 is a flow diagram illustrating a process for multicast convergence.

FIG. 3 is a flow diagram illustrating a process for multicast convergence. A multicast packet is received 310 at a network device. The network device determines 320 whether there is a cache-hit or a cache-miss for the packet, based at least in part on the source IP address and the group multicast IP address (i.e., (S, G) address combination) of the packet. If the packet causes a cache-hit, then the packet is forwarded 330 according to the forwarding information in the cache entry. If the packet causes a cache-miss, the network device enters a state of initial hardware-flooding 340 with respect to traffic having that (S, G) combination. The hardware-flooding causes the packet to be forwarded on egress ports of the network device per VLAN membership. In other words, the packet may be forwarded on all egress ports of the network device, but not necessarily all egress ports.

In addition to flooding the packet, a copy of the packet that caused the cache-miss is sent 350 to a processing unit on the network device. The processing unit then creates 360 a cache entry for the (S, G) combination. The sending and processing of the cache-miss packet may occur before, during, and/or after the hardware-flooding commences. The cache entry allows subsequent packets with the same (S, G) combination to be forwarded in hardware without cache-miss processing. As mentioned above, the processing of the cache-miss packet does not include slow-path forwarding because it would create duplicate packets on the network.

Figure 4:
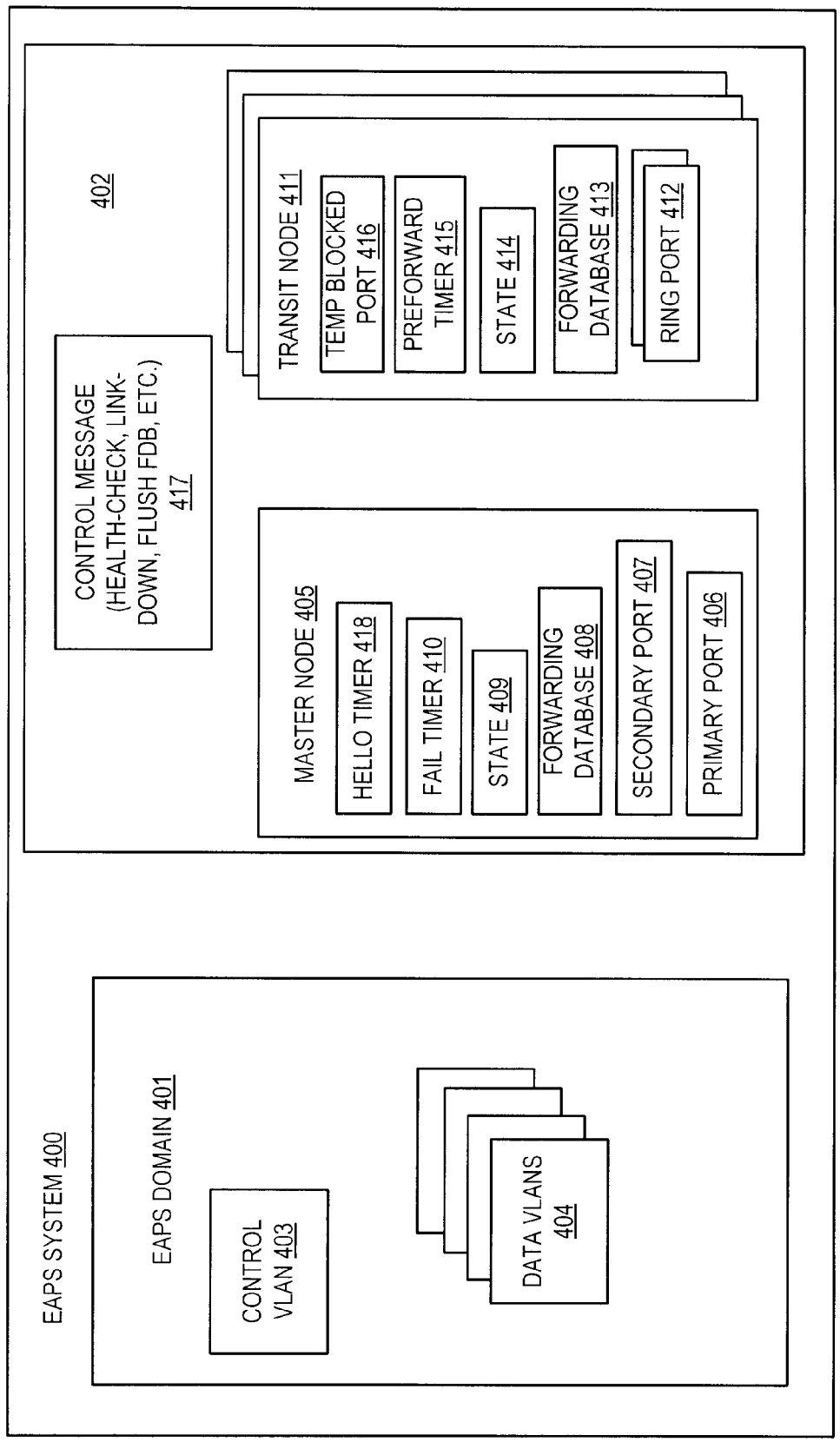
FIG. 4 is a block diagram illustrating a prior art Ethernet Automatic Protection Switching (EAPS) system.

FIG. 4 is a block diagram illustrating a prior art Ethernet Automatic Protection Switching (EAPS) system. The EAPS system 400 consists of one or more EAPS domains 401. A control VLAN 403 is created for each EAPS domain 401 for the purpose of sending and receiving EAPS system control messages 417. The EAPS domain 401 is created to protect a group of one or more data carrying VLANs 404.

The EAPS system 400 operates on a ring network 402. One node on the ring network 402 is designated as the master node 405. The two ring ports on the master node 405 are designated as primary port 406 and secondary port 407. All other nodes on the ring network 402 are transit nodes 411 and each has its respective ring ports 412. Each master node 405 and transit node 411 has a forwarding database (FDB), 408 and 413 respectively, in which they store information about the network communication paths. The master node 405 has a state register 409 for storing the state of the ring network 402. For the purpose of illustration, the states of the ring network 402 are described either as "failed," meaning there is a fault or break in the ring network 402, or as "complete," meaning that the ring network is unbroken or the ring network has been restored and all nodes are communicating correctly. The transit nodes 411 have a state register 414 in which they store the pre-forwarding state, and a pre-forwarding timer 415. The transit nodes 411 also have a temporarily-blocked-port storage area (TBP) 416 in which they store the identification of the port that is temporarily blocked.

The master node 405 and the transit nodes 411 use control messages 417 to communicate via the control VLAN 403. Some examples of control messages 417 in embodiments are health-check messages, link-down messages, and flush-FDB messages. The transit node 411 recognizes a message sent on the control VLAN 403 as a control message 417 because it has a special MAC (media access control) address that corresponds to an entry in the forwarding database 413. The master node and the transit nodes forward the control message 417 prior to copying it to the central processing unit (CPU) of the node where, among other things, it is logged for use in troubleshooting. Forwarding the control message 417 before processing by the CPU facilitates the convergence of the ring network 402 after a fault in substantially less time than can be achieved with previous prior art methods.

The master node 405 has a hello-timer 418, which is the clock for sending the health-check control messages 417. Once the hello-timer 418 is started, it prompts the master node 405 to send a health-check message 417 on the control VLAN 403 at regular intervals, for example every one second. The health-check message 417 is forwarded around the ring network 402 and returns to the master node 405 nearly instantaneously. When the master node 405 sends the health-check message 417, it sets the fail-timer 410. Should the fail-timer 410 expire before the health-check message is returned to the master node 405, the master node 405 determines that there is a fault in the ring network 402. The health-check messages 417 are sent even during a fault. When the fault is restored, the master node 405 knows immediately because the return of the health-check message 417 is resumed.

Figure 5:
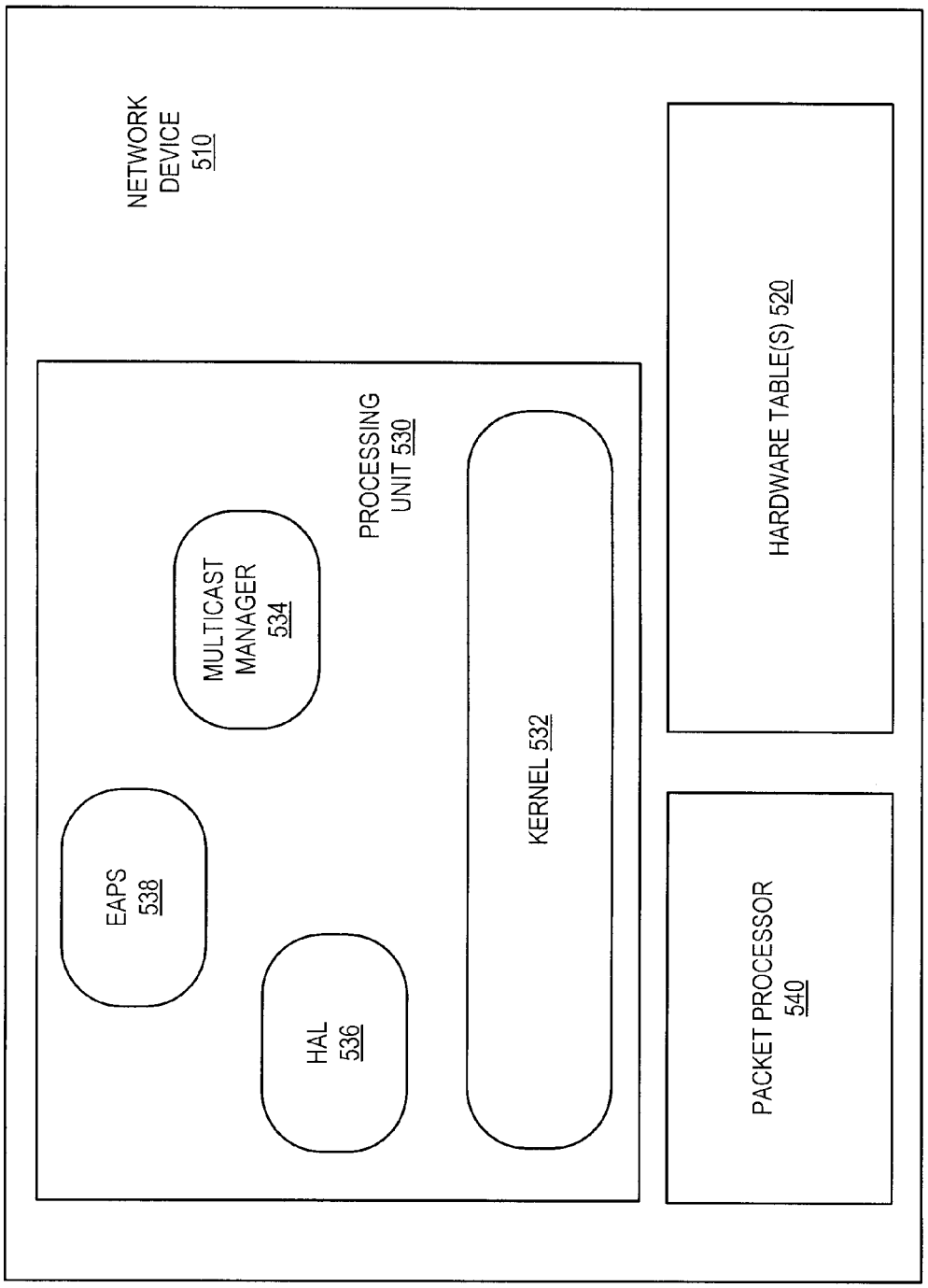
FIG. 5 is a block diagram illustrating a network device that employs Ethernet Automatic Protection Switching (EAPS).

FIG. 5 is a block diagram illustrating a network device that employs Ethernet Automatic Protection Switching (EAPS) according to various embodiments. Network device 510 includes one or more hardware tables 520 (e.g., cache) a processing unit 530 (e.g., a central processing unit (CPU), a network processing unit (NPU), etc.), and a packet processor 540. In some embodiments, whenever there is an EAPS topology change, EAPS 538 sends a MC manager 534 a list of VLANs along with its port lists. MC manager 534 already has a list of forwarding entries that have been programmed in hardware abstraction layer (HAL) 536 and a list of other entries that are in its software table based on IGMP reports.

Thus, when MC manager 534 receives the list of VLANs and the port lists from EAPS 538, MC manager 534 treats this information much like it would IGMP reports. In other words, for forwarding entries that have already been programmed in HAL 536, MC manager 534 will add the EAPS egress ports (corresponding to particular multicast streams) to its cache list and send the updated cache list to HAL 536. The difference is that the EAPS egress ports lists are received by MC manager 534 much more quickly than IGMP reports, thus significantly reducing the convergence time of the multicast stream(s).

For forwarding entries that have not been programmed in HAL 536 for a known multicast stream, MC manager 534 will add the EAPS ports to its existing multicast group list. For streams that are not in HAL 536, data flow will only resume when such streams reach the network device, cause a Layer 2 (L2) cache miss and the L2 cache miss is sent to MC Manager 534. MC manager 534 will process the cache miss by updating HAL 536 with a new cache entry. Once the new cache entry has been created, data flow for the new stream(s) will be switched in hardware.

In other embodiments, in addition to receiving port lists from EAPS 538 (rather than wait for IGMP reports), MC manager 534 initiates a hardware-flooding state and starts a timer. The timer might be around 45 seconds in length in some embodiments, but it could be much shorter or longer depending on the particular needs of the network. As part of initiating the flooding state, MC manager 534 programs HAL 536 to set relevant VLANs into a hardware-flooding mode. With this hardware-flooding state/mode, MC manager 534 receives L2 cache misses, creates cache entries and programs HAL 536, as described previously, and L2 cache misses will begin to taper off as hardware entries get populated. However, the hardware (i.e., packet processor 540 and hardware table(s) 520) will be in a state such that it is in the hardware-flooding mode (e.g., on a particular VLAN), but at the same time, cache hits on the hardware will be honored by forwarding based on the egress port list for the cache hit. Thus, for those entries programmed in hardware, packets will not be flooded or sent to processing unit 530. However, for all other multicast data packet where there is a cache miss, these packets will be flooded in hardware while a copy of the cache miss packet is sent to CPU 530 for processing (i.e., learning and/or generating a new cache entry without forwarding the packet back out to the network).

Once the flooding timer expires, MC manager 534 reverts back to the standard IGMP snooping-enable mode.

It should be noted that when EAPS 538 sends a message to MC manager 534 to initiate hardware-flooding, existing cache entries should not be flushed. Otherwise, additional cache misses will be generated and sent to processing unit 530, causing further processing strain.

In embodiments that involve EAPS rings, it is possible that an egress port for which there is no receiver is added to a multicast group list. Using regular IGMP ageing, traffic sent to a port with no receiver will eventually age out, but it may be longer than is desirable. Thus, a "fast" age-out could be employed. For example, if IGMP queries are being used, an IGMP report should be expected within a certain period of time (e.g., 5-10 seconds, or shorter or longer). The expected time for receiving the report could be used as the "fast" age-out time to reduce the amount of unnecessary traffic.

Figure 6:
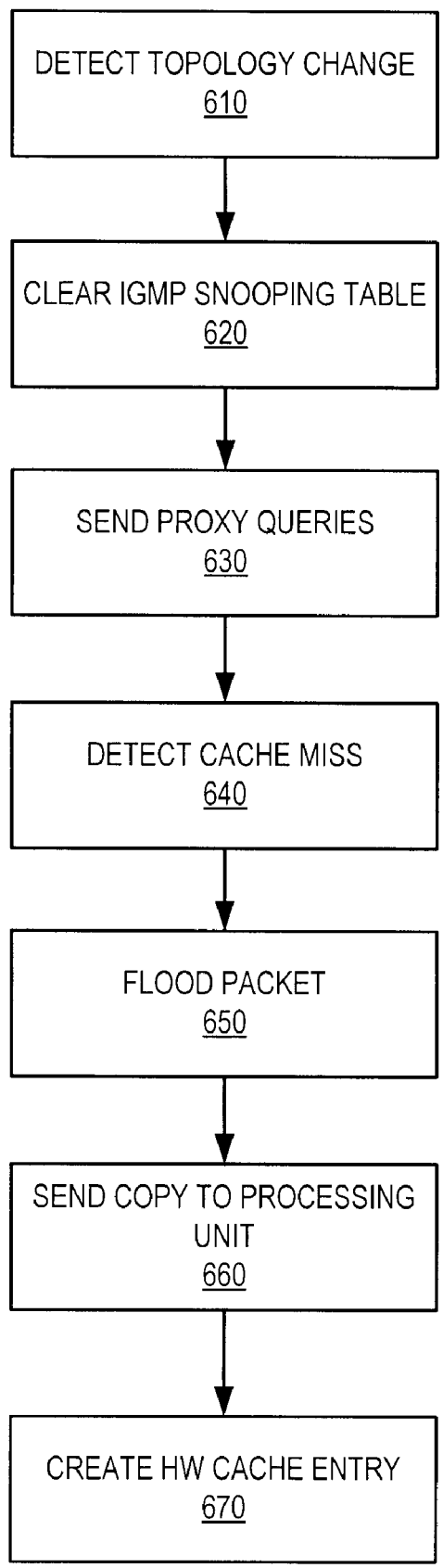
FIG. 6 is a flow diagram illustrating a process for multicast convergence in an EAPS ring network.

FIG. 6 is a flow diagram illustrating a process for multicast convergence in an EAPS ring network. A topology change is detected 610 in the EAPS network. In response, at least one node clears 620 its IGMP snooping table. Proxy IGMP queries are sent 630 to relearn multicast forwarding entries. At some point, a cache miss is detected 640 on the EAPS network. Rather than send the cache-miss packet to the processing unit for slow-path forwarding, the packet is flooded 650 via hardware out to the network on one or more egress ports. A copy of the cache-miss packet is sent 660 to the device's processing unit where a hardware cache entry is created 670 for the cache-miss packet. The processing unit does not slow-path forward the cache-miss packet back to the network.

Figure 7:
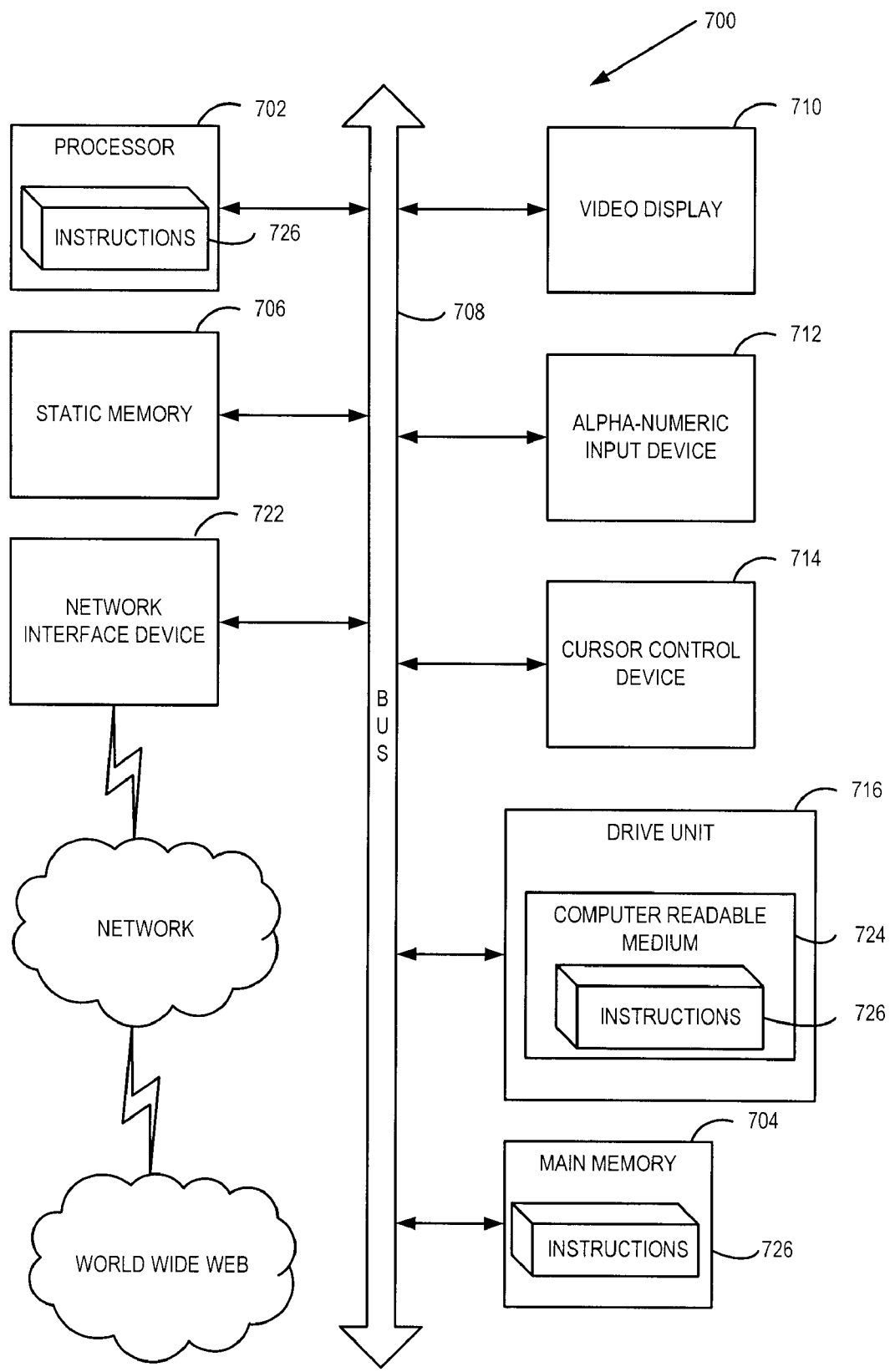
FIG. 7 is a block diagram illustrating a suitable computing environment for practicing various embodiments described herein.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processor 702, a main memory 704 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a secondary memory 818 (e.g., a data storage device), which communicate with each other via a bus 708.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, a processor implementing other instruction sets, or processors implementing a combination of instruction sets. Processor 702 may also be one or more special-purpose processing devices such as an application specific integrated circuit (ASIC), a field programmable gate array (FPGA), a digital signal processor (DSP), network processor, or the like. Processor 702 is configured to execute the processing logic 126 for performing the operations and steps discussed herein.

The computer system 700 may further include a network interface device 716. The computer system 700 also may include a video display unit 710 (e.g., a liquid crystal display (LCD) or a cathode ray tube (CRT)), an alphanumeric input device 712 (e.g., a keyboard), and a cursor control device 714 (e.g., a mouse).

The secondary memory 718 may include a machine-readable storage medium (or more specifically a computer-readable storage medium) 724 on which is stored one or more sets of instructions (e.g., software 722) embodying any one or more of the methodologies or functions described herein. The software 722 may also reside, completely or at least partially, within the main memory 704 and/or within the processing device 702 during execution thereof by the computer system 700, the main memory 704 and the processing device 702 also constituting machine-readable storage media. The software 722 may further be transmitted or received over a network 720 via the network interface device 716.

While the machine-readable storage medium 724 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine readable storage medium" shall accordingly be taken to include, but not be limited to, solid-state memories, and optical and magnetic media.

Various operations or functions are described herein, which may be implemented or defined as software code or instructions. Such content may be directly executable ("object" or "executable" form), source code, or difference code. Software implementations of the embodiments described herein may be provided via an article of manufacture with the code or instructions stored thereon, or via a method of operating a communication interface to send data via the communication interface. A machine or computer readable storage medium may cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

The present invention also relates to a system for performing the operations herein. This system may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CDROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized system to perform the required operations of the method. Structure for a variety of these systems will appear as set forth in the description below. In addition, the present invention is not described with reference to any particular programming language or operating system. It will be appreciated that a variety of programming languages may be used to implement the teachings of the invention as described herein, and the teachings may be implemented within a variety of operating systems.

Various components described herein may be a means for performing the functions described herein. Each component described herein includes software, hardware, or a combination of these. The operations and functions described herein can be implemented as software modules, hardware modules, special-purpose hardware (e.g., application specific hardware, application specific integrated circuits (ASICs), digital signal processors (DSPs), etc.), embedded controllers, hardwired circuitry, etc.

Aside from what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method comprising:
   receiving from a source node a multicast data packet at a transit node, the multicast data packet having a source address and a multicast group address;
   comparing the source address and the multicast group address of the multicast data packet with a hardware entry of a hardware cache;
   detecting at the transit node a hardware cache miss for the multicast data packet in response to the comparing not resulting in a match of the hardware entry with the source address and the multicast group address of the multicast data packet;
   flooding via hardware the multicast data packet to ports of the network in response to detecting the hardware cache miss, wherein the flooding comprises forwarding a copy of the multicast data packet to neighboring nodes of the transit node based on virtual local area network (VLAN) membership;
   sending a copy of the multicast data packet to an out-of-line processing unit;
   software-processing the copy of the multicast data packet without forwarding the copy onto the network from the out-of-line processing unit, the software-processing to include establishing a hardware cache entry for the multicast data packet via a hardware abstraction layer; and
   forwarding a future multicast data packet only to neighboring nodes of the transit node that subscribe to multicast traffic in response to matching a source address and a multicast group address of the future multicast data packet with the hardware cache entry for the multicast data packet.

2. The method of claim 1, wherein the out-of-line processing unit is one of a central processing unit (CPU) or a network processing unit (NPU).

3. The method of claim 1, wherein flooding via hardware the multicast data packet to ports of the network comprises:
   entering a state of initial hardware flooding while the copy of the multicast data is being software-processed by the out-of-line processing unit.

4. A method comprising:
   comparing a source address and a multicast group address of a multicast data packet with a hardware entry of a hardware cache;

detecting at an Ethernet Automatic Protection Switching (EAPS) node a hardware cache miss for the multicast data packet, the detecting in response to the comparing not resulting in a match of the hardware entry with the source address and the multicast group address of the multicast data packet;

flooding via hardware the multicast data packet to ports of an EAPS network in response to detecting the hardware cache miss, wherein the flooding comprises forwarding a copy of the multicast data packet to neighboring nodes of the EAPS node based on virtual local area network (VLAN) membership;

sending a copy of the multicast data packet to an out-of-line processing unit;

software-processing the copy of the multicast data packet without forwarding the copy to the EAPS network from the out-of-line processing unit, the software-processing to include establishing a hardware cache entry for the multicast data packet via a hardware abstraction layer; and forwarding a future multicast data packet only to neighboring nodes of the EAPS node that subscribe to multicast traffic in response to matching a source address and a multicast group address of the future multicast data packet with the hardware cache entry for the multicast data packet.

5. The method of claim 4, wherein the hardware-flooding is commenced with a corresponding timer.

6. The method of claim 5, further comprising ceasing the hardware-flooding upon expiration of the timer.

7. A network device comprising:
a packet processor operable to receive a multicast data packet having a source address and a multicast group address;
a hardware cache operable to store forwarding entries for multicast traffic, the forwarding entries based on a source address and a multicast group address;
the packet processor further operable to:
compare the source address and the multicast group address of the multicast data packet with a forwarding entry of the hardware cache;
detect a hardware cache miss for the multicast data packet in response to the comparing not resulting in a match of the forwarding entry with the source address and the multicast group address of the multicast data packet,
flood the multicast packet to ports of a network in response to detecting the hardware cache miss, wherein flooding comprises forwarding a copy of the multicast data packet to neighboring nodes of the transit node based on virtual local area network (VLAN) membership, and
send a copy of the multicast data packet to a processing unit;
wherein the processing unit is further operable to software-process the copy of the multicast data packet without forwarding the copy to the network, the software-processing to include establishing a hardware cache entry for the multicast data packet via a hardware abstraction layer, and
wherein the packet processor is further operable to forward a future multicast data packet only to neighboring nodes of the transit node that subscribe to multicast traffic in response to matching a source address and a multicast group address of the future multicast data packet with the hardware cache entry for the multicast data packet.

8. The network device of claim 7, wherein the processing unit includes an Ethernet automatic protection switching (EAPS) component to configure the network device on an EAPS network.

9. The network device of claim 8, wherein the packet processor further comprises a timer and wherein the flooding by the packet processor ceases upon expiration of the timer.

10. The network device of claim 7, wherein the processing unit includes a command line interface (CLI) to configure the network device on a network.

11. A computer readable storage medium having computer executable instructions stored thereon that, when executed by a computer, cause the computer to perform a method comprising:
receiving from a source node a multicast data packet at a transit node, the multicast data packet having a source address and a multicast group address;
comparing the source address and the multicast group address of the multicast data packet with a hardware entry of a hardware cache;
detecting at the transit node a hardware cache miss for the multicast data packet in response to the comparing not resulting in a match of the hardware entry with the source address and the multicast group address of the multicast data packet;
flooding via hardware the multicast data packet to ports of the network, wherein the flooding comprises forwarding a copy of the multicast data packet to neighboring nodes of the transit node based on virtual local area network (VLAN) membership;
sending a copy of the multicast data packet to an out-of-line processing unit;
software-processing the copy of the multicast data packet without forwarding the copy to the network from the out-of-line processing unit, the software-processing to include establishing a hardware cache entry for the multicast data packet via a hardware abstraction layer; and
forwarding a future multicast data packet only to neighboring nodes of the transit node that subscribe to multicast traffic in response to matching a source address and a multicast group address of the future multicast data packet with the hardware cache entry for the multicast data packet.

12. The computer readable storage medium of claim 11, wherein the out-of-line processing unit is one of a central processing unit (CPU) or a network processing unit (NPU).

13. The computer readable storage medium of claim 11, wherein flooding via hardware the multicast data packet to ports of the network comprises:
entering a state of initial hardware flooding while the copy of the multicast data is being software-processed by the out-of-line processing unit.

14. A computer readable storage medium having computer executable instructions stored thereon that, when executed by a computer, cause the computer to perform a method comprising:
comparing a source address and a multicast group address of a multicast data packet with a hardware entry of a hardware cache;
detecting at an Ethernet Automatic Protection Switching (EAPS) node a hardware cache miss for the multicast data packet, the detecting in response to the comparing not resulting in a match of the hardware entry with the source address and the multicast group address of the multicast data packet;
flooding via hardware the multicast data packet to ports of an EAPS network, wherein the flooding comprises forwarding a copy of the multicast data packet to neighboring nodes of the EAPS node based on virtual local area network (VLAN) membership;

sending a copy of the multicast data packet to an out-of-line processing unit;

software-processing the copy of the multicast data packet without forwarding the copy onto the EAPS network from the out-of-line processing unit, the software-processing to include establishing a hardware cache entry for the multicast data packet via a hardware abstraction layer; and forwarding a future multicast data packet only to neighboring nodes of the EAPS node that subscribe to multicast traffic in response to matching a source address and a multicast group address of the future multicast data packet with the hardware cache entry for the multicast data packet.

15. The computer readable storage medium of claim 14, wherein the hardware-flooding is commenced with a corresponding timer.

16. The computer readable storage medium of claim 15, further comprising ceasing the hardware-flooding upon expiration of the timer.

17. The computer readable storage medium of claim 14, wherein flooding via hardware the multicast data packet to ports of the network comprises:

entering a state of initial hardware flooding while the copy of the multicast data is being software-processed by the out-of-line processing unit.

* * * * *